E. L. SHARPNECK.
ROLLER BEARING.
APPLICATION FILED MAY 10, 1909.
978,496.
Patented Dec. 13, 1910.
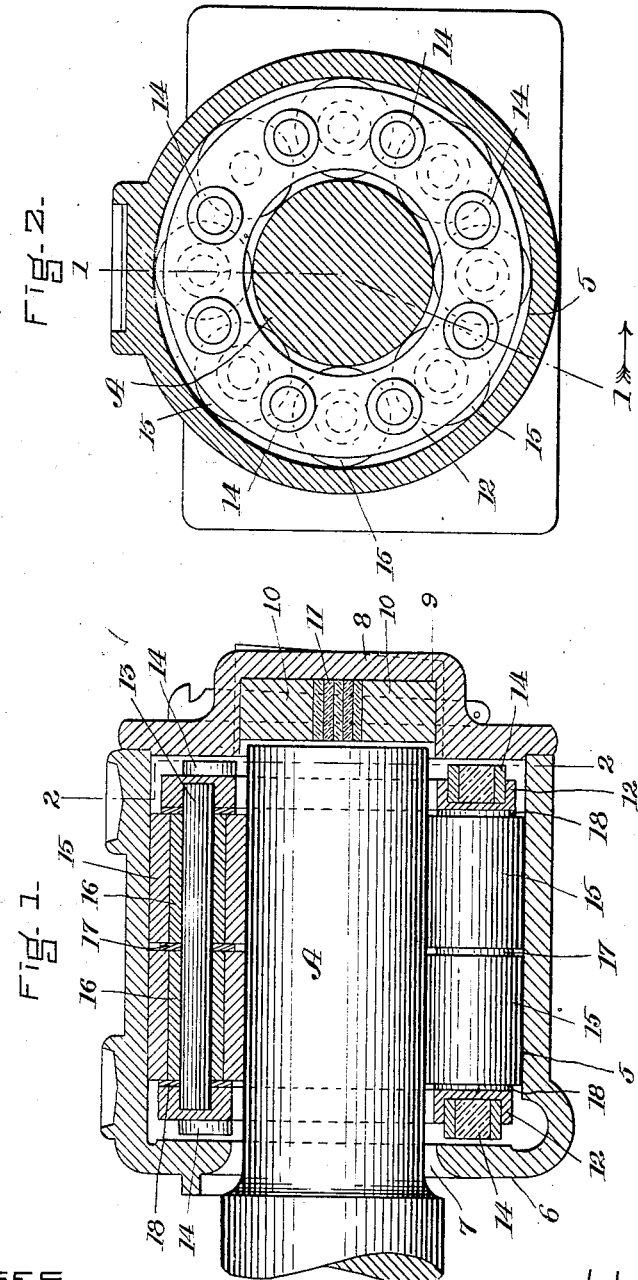
WITNESSES:
A. D. Grover
M. M. Herrington
INVENTOR:
Eliel L. Sharpneck
By Henry J. Miller
atty.

UNITED STATES PATENT OFFICE.

ELIEL L. SHARPNECK, OF WINTHROP, MASSACHUSETTS.

ROLLER-BEARING.

978,496.

Specification of Letters Patent.  Patented Dec. 13, 1910.

Application filed May 10, 1909. Serial No. 495,032.

*To all whom it may concern:*

Be it known that I, ELIEL L. SHARPNECK, of Winthrop, in the county of Suffolk and State of Massachusetts, have invented a new and useful Improvement in Roller-Bearings, of which the following is a specification, reference being had to the accompanying drawings, forming part thereof.

This invention relates to improvements in roller bearings and refers particularly to the means whereby frictional resistance between movable parts of the bearing is reduced.

The object of the invention is to so construct a roller bearing comprising a cage and antifriction rolls rotatably mounted therein, that frictional resistance is reduced between the ends of said cage and the stationary parts of the box in which the bearing is contained.

The invention consists in such novel features of construction and combination of parts as shall hereinafter be more fully described and pointed out in the claim.

Figure 1, represents a sectional view of the improved roller bearing, taken on line 1—1 Fig. 2, showing the bearing as applied to a journal box for car axles. Fig. 2, represents a sectional view of the same taken on line 2—2 Fig. 1.

Similar numbers of reference designate corresponding parts throughout.

For the purpose of illustrating one use of this improved roller bearing the same is shown herein as contained within a journal box having the cylindrical inner wall 5 and the end wall 6 having the axial opening 7. Provision is made for closing the open end of said box by means of the cover 8 having the pocket 9 in which is seated an antifriction block formed by the segmental wooden members 10—10 having between them the diametrically extending layers 11—11, preferably of raw hide, which form a thrust bearing for the shaft A which extends through the opening 7.

Within the journal box is a cage comprising a pair of annular metallic members 12—12 each having sockets at their inner sides to receive the ends of the roll shafts 13—13 and, at their outer sides having sockets to receive and hold in position the antifriction plugs 14—14 formed of wood and raw hide or other material adapted to absorb lubricant. On each of the roll shaft 13 is journaled a pair of antifriction rolls each of which comprises the metallic shell 15, adapted to contact with the wall 5 and with the periphery of the shaft A, and the wooden bushing 16 driven into said shell 15 and having a bore journaled on the shaft 13. Antifriction washers 17—17 and 18—18 are also provided on the shafts to separate, respectively, the pairs of antifriction rolls and the ends of said rolls from the annular members 12—12.

By the use of this device the antifriction rolls are free to rotate independently between the surface of the cylindrical way 5 and the periphery of the shaft A while each pair of said rolls may rotate independently on their shaft. The entire cage is also free to rotate and the respective series of antifriction plugs 14—14 may at times contact with the ends of the journal box and are adapted to reduce the frictional contact therewith while said plugs are so mounted that they are positively moved with the cage. The wooden bushings 16, the plugs 14—14 and the thrust block carried by the cover 8 are all preferably saturated with lubricant of some well known nature.

Having thus described my invention I claim as new and desire to secure by Letters Patent.

A roller bearing comprising a casing having a cylindrical way and ends, and a cage contained within said way and having annular end members furnished at their outer surfaces with antifriction plugs, fixed to said end members, shafts mounted in said end members, and a pair of antifriction rolls rotatably mounted on each of said shafts, said rolls of each pair being separated by washers as and for the purpose described.

ELIEL L. SHARPNECK.

Witnesses:
H. J. MILLER,
M. M. HARRINGTON.